(12) United States Patent
Lee et al.

(10) Patent No.: US 12,398,500 B2
(45) Date of Patent: Aug. 26, 2025

(54) INTEGRATED LAUNDRY PROCESSING APPARATUS AND CONTROL METHOD THEREOF

(71) Applicant: LG Electronics Inc., Seoul (KR)

(72) Inventors: Dongsoo Lee, Seoul (KR); Taewoong Kim, Seoul (KR); Hyemin Kang, Seoul (KR)

(73) Assignee: LG Electronics Inc., Seoul (KR)

( * ) Notice: Subject to any disclaimer, the term of this patent is extended or adjusted under 35 U.S.C. 154(b) by 800 days.

(21) Appl. No.: 17/769,969

(22) PCT Filed: Oct. 12, 2020

(86) PCT No.: PCT/KR2020/013872
§ 371 (c)(1),
(2) Date: Apr. 18, 2022

(87) PCT Pub. No.: WO2021/075811
PCT Pub. Date: Apr. 22, 2021

(65) Prior Publication Data
US 2022/0372685 A1 Nov. 24, 2022

(30) Foreign Application Priority Data
Oct. 18, 2019 (KR) .................... 10-2019-0129863

(51) Int. Cl.
*D06F 34/26* (2020.01)
*D06F 25/00* (2006.01)
(Continued)

(52) U.S. Cl.
CPC .............. *D06F 34/26* (2020.02); *D06F 25/00* (2013.01); *D06F 29/005* (2013.01); *D06F 33/63* (2020.02);
(Continued)

(58) Field of Classification Search
CPC .......... D06F 33/63; D06F 34/26; D06F 25/00; D06F 29/005; D06F 58/38; D06F 58/63;
(Continued)

(56) References Cited

U.S. PATENT DOCUMENTS 2,737,799 A * 3/1956 Knipmeyer ............. D06F 13/02
68/25
3,266,167 A * 8/1966 Finnegan ............... G05D 22/02
361/178
(Continued)

FOREIGN PATENT DOCUMENTS

CN 1500932 6/2004
CN 102758342 10/2012
(Continued)

OTHER PUBLICATIONS

International Search Report in International Appln. No. PCT/KR2020/013872, dated Jan. 19, 2021, 6 pages (with English translation).
(Continued)

*Primary Examiner* — Stephen M Gravini
(74) *Attorney, Agent, or Firm* — Fish & Richardson P.C.

(57) ABSTRACT

A laundry treatment apparatus includes a washing machine module and a drying machine module that are integrally installed in a common cabinet, and a single drying module configured to produce dry hot air. The laundry treatment apparatus has a reduced product size and performs a method for drying laundry in a washing drum and a drying drum. The method includes detecting a dryness in real time while performing drying processes simultaneously in the washing drum and the drying drum by the common drying module, and controlling an amount of supplied dry hot air and an amount of recovered dry hot air to be different to reduce an overall drying process time and electric power consumption. The drying processes performed in the drying machine of
(Continued)

the washing machine are simultaneously completed to improve convenience for a user.

21 Claims, 10 Drawing Sheets

(51) Int. Cl.
    *D06F 29/00*     (2006.01)
    *D06F 33/63*     (2020.01)
    *D06F 58/24*     (2006.01)
    *D06F 58/26*     (2006.01)
    *D06F 58/38*     (2020.01)
    *D06F 103/34*     (2020.01)
    *D06F 105/32*     (2020.01)

(52) U.S. Cl.
    CPC .............. *D06F 58/24* (2013.01); *D06F 58/26* (2013.01); *D06F 58/38* (2020.02); *D06F 2103/34* (2020.02); *D06F 2105/32* (2020.02)

(58) Field of Classification Search
    CPC ...... D06F 58/24; D06F 58/26; D06F 2105/32; D06F 2103/34
    USPC ............................................. 34/282, 595–610
    See application file for complete search history.

(56) References Cited

U.S. PATENT DOCUMENTS

| | | | | |
|---|---|---|---|---|
| 4,621,438 | A * | 11/1986 | Lanciaux | D06F 58/06 34/604 |
| 5,651,192 | A * | 7/1997 | Horwitz | D06F 58/30 236/78 D |
| 6,493,963 | B1 * | 12/2002 | England | D06F 58/38 34/575 |
| 9,534,329 | B2 * | 1/2017 | Contarini | D06F 29/005 |
| 10,184,208 | B2 * | 1/2019 | Rizzi | D06F 58/38 |
| 11,773,531 | B2 * | 10/2023 | Cook, IV | D06F 58/46 34/491 |
| 12,188,172 | B2 * | 1/2025 | Ryoo | D06F 58/48 |
| 2022/0372685 | A1 * | 11/2022 | Lee | D06F 58/38 |
| 2024/0328068 | A1 * | 10/2024 | Choe | D06F 58/206 |
| 2024/0352638 | A1 * | 10/2024 | Vargas | D06F 34/26 |
| 2025/0034792 | A1 * | 1/2025 | Chung | D06F 58/38 |

FOREIGN PATENT DOCUMENTS

| | | | | |
|---|---|---|---|---|
| CN | 208562910 | | 3/2019 | |
| EP | 4047118 | A1 * | 8/2022 | ............ D06F 25/00 |
| EP | 4310237 | A1 * | 1/2024 | ............ D06F 34/18 |
| JP | H08173694 | | 7/1996 | |
| JP | 2008307151 | | 12/2008 | |
| KR | 20060038796 | | 5/2006 | |
| KR | 20210046300 | A * | 4/2021 | |
| RU | 2413806 | | 3/2011 | |
| WO | WO 2007/111413 | | 10/2007 | |
| WO | WO 2019/134478 | | 7/2019 | |
| WO | WO-2021075811 | A1 * | 4/2021 | ............ D06F 25/00 |

OTHER PUBLICATIONS

Search Report in Russian Appln. No. 2022110364, mailed on Sep. 27, 2022, 4 pages (with English translation).

Extended European Search Report in European Appln. No. 20877790.4, mailed on Oct. 16, 2023, 8 pages.

* cited by examiner

INTEGRATED LAUNDRY PROCESSING APPARATUS AND CONTROL METHOD THEREOF

CROSS-REFERENCE TO RELATED APPLICATIONS

This application is a National Stage application under 35 U.S.C. § 371 of International Application No. PCT/KR2020/013872, filed on Oct. 12, 2020, which claims the benefit of Korean Application No. 10-2019-0129863, filed on Oct. 18, 2019. The disclosures of the prior applications are incorporated by reference in their entirety.

TECHNICAL FIELD

The present disclosure relates to an integrated laundry treatment apparatus and a method of controlling the same, and more particularly, to an integrated laundry treatment apparatus, in which a washing machine module configured to perform a washing process and a drying machine module configured to perform a drying process are disposed in a common cabinet, and a method of controlling the same.

BACKGROUND

A washing machine refers to a laundry treatment apparatus configured to wash laundry in a drum disposed in a cabinet and configured to be rotated by a drive device. The washing machines may be classified into a top-loading type washing machine and a front-loading type washing machine depending on a posture of the drum.

For instance, the front-loading washing machine has a laid drum, and the top-loading washing machine has an upright drum. The laundry is loaded into the front-loading washing machine through a front portion of the washing machine. The front-loading washing machine may have a smaller size and a larger washing capacity than the top-loading washing machine. In addition, because the front-loading washing machine has high washing performance and does not cause a tangle of laundry, the front-loading washing machine is widely used.

In addition, a combo-type drying-washing machine, to which a drying function is added by mounting a drying module in the front-loading washing machine, is also widely used.

In some cases, because the drying module installed in the combo-type drying-washing machine has a limited drying capacity, a large amount of drying time may be taken to dry the entire laundry washed completely.

Therefore, in some cases, to shorten the drying time, as another laundry treatment apparatus, a drying machine, which has been developed for the purpose of drying the laundry, particularly, a front-loading drying machine similar to the front-loading washing machine, may be used together with the combo-type washing machine.

In some cases, where the washing machine and the drying machine may be installed together and disposed side by side in a horizontal direction, the washing machine and the drying machine may occupy a large horizontal area.

In some cases, the washing machine and the drying machine may be stacked in a vertical direction, where, for example, the drying machine is stacked on the washing machine.

In some cases, where the washing machine and the drying machine are stacked in the vertical direction, independent functional modules, particularly, the drying modules may be provided in the washing machine and the drying machine, which may increase a height of a product in which the washing machine and the drying machine are stacked. As a result, there is a restriction on a position at which the washing machine and the drying machine are installed together. For example, if the entire position at which the washing machine and the drying machine are stacked is higher than a height of the general home, the washing machine and the drying machine may not be installed in the location.

In some cases, an integrated laundry treatment apparatus may include a washing machine and a drying machine that are assembled and stacked together in a single cabinet, and the washing machine and the drying machine may share some components for implementing functions of a product, thereby reducing an overall size of the product, particularly, an overall height of the product.

For example, a drive motor and a drying module may be common components for the washing machine and the drying machine. In some cases, the shared drying module includes a common duct, a condenser, a heater, a fan, and a motor which are disposed in the common duct, and inlet and outlet valves configured to switch an outlet and an inlet of the common duct.

The common drying module may supply hot air to a washing drum and a drying drum by adjusting an inlet valve and an outlet valve to perform drying processes simultaneously in the washing machine and the drying machine, and the common drying module may recover the hot air.

In some cases, after the laundry in any one of the washing drum and the drying drum is completely dried by the drying processes simultaneously performed in the washing drum and the drying drum, the hot air may continue to be supplied to the drum in which the laundry is completely dried. In some cases, the laundry may be damaged by the hot air, or unnecessary electric power consumption may be incurred.

In some cases, the drying processes may be performed in the washing drum and the drying drum without monitoring a dried state of the laundry, where the hot air may be continuously supplied and the drum may operate for a preset drying time, which may cause inefficiency in drying time and electric power consumption.

SUMMARY

The present disclosure describes an integrated laundry treatment apparatus, which includes a washing machine module and a drying machine module that are integrally installed in a common cabinet, and a single drying module that is provided to produce dry hot air such that a size of a product can be reduced, where a dried state of laundry in a washing drum and a drying drum is detected in real time while drying processes are simultaneously performed in the washing drum and the drying drum by the common drying module. The amount of supplied dry hot air and the amount of recovered dry hot air can be differently controlled such that an overall drying process time can be reduced and electric power consumption can be minimized. The drying processes performed in the drying process and the drying machine of the washing machine can be simultaneously completed such that convenience for a user can be improved. The present disclosure also describes a method for controlling the integrated laundry treatment apparatus.

According to one aspect of the subject matter described in this application, a laundry treatment apparatus includes a cabinet that defines an accommodation space therein, a first laundry treatment module disposed in a first portion of the accommodation space, a second laundry treatment module disposed in a second portion of the accommodation space, and a drying module that is configured to produce hot air and has a first outlet and a second outlet that are configured to supply the hot air to the first laundry treatment module and the second laundry treatment module, respectively, and a first inlet and a second inlet that are configured to receive return air from the first laundry treatment module and the second laundry treatment module, respectively. The drying module is configured to absorb at least a part of moisture in the return air. The laundry treatment apparatus further includes an outlet flow path switching valve configured to (i) selectively open one of the first outlet or the second outlet or (ii) simultaneously open both of the first outlet and the second outlet, an inlet flow path switching valve configured to (i) selectively open one of the first inlet or the second inlet or (ii) simultaneously open both of the first inlet and the second inlet, a first humidity sensor configured to measure a first humidity of the return air received through the first inlet, a second humidity sensor configured to measure a second humidity of the return air received through the second inlet, and a controller electrically connected to the first humidity sensor and the second humidity sensor and configured to produce a control signal for operating at least one of the outlet flow path switching valve or the inlet flow path switching valve. The controller is configured to receive a first sensor signal related to the first humidity and a second sensor signal related to the second humidity, the first humidity and the second humidity being measured while the hot air is supplied to the first laundry treatment module and the second laundry treatment module, determine a difference value between the first humidity and the second humidity based on receiving the first sensor signal and the second sensor signal, and based on the difference value exceeding a predetermined threshold value, operate the outlet flow path switching valve to change a first opening degree of the first outlet or a second opening degree of the second outlet, or both.

Implementations according to this aspect can include one or more of the following features. For example, the laundry treatment apparatus can further include a hot air supply duct that includes a first supply duct that connects the first outlet to the first laundry treatment module, and a second supply duct that connects the second outlet to the second laundry treatment module. The laundry treatment apparatus can further include a hot air recovery duct that includes a first recovery duct that connects the first inlet to the first laundry treatment module, and a second recovery duct that connects the second inlet to the second laundry treatment module. In some examples, the first humidity sensor can be disposed in the first recovery duct adjacent to the first inlet, and the second humidity sensor can be disposed in the second recovery duct adjacent to the second inlet.

In some implementations, the drying module can include a common duct that defines a hot air flow path having the first and second inlets and the first and second outlets, a heater disposed in the common duct and configured to produce the hot air, a blower fan disposed in the common duct and configured to blow the hot air toward the first outlet and the second outlet, and a condenser configured to absorb at least a part of the moisture included in the return air received through the first inlet and the second inlet.

In some implementations, the controller can be configured to, before determining the difference value between the first humidity and the second humidity, compare the first humidity and the second humidity to a predetermined target humidity, and based on both of the first humidity and the second humidity exceeding the predetermined target humidity, calculate the difference value between the first humidity and the second humidity. In some examples, the predetermined target humidity can be a relative humidity of 60%. In some examples, the predetermined threshold value can be a relative humidity of 10%.

In some implementations, the laundry treatment apparatus can include a first actuator electrically connected to the controller and configured to operate the outlet flow path switching valve based on the control signal of the controller, and a second actuator electrically connected to the controller and configured to operate the inlet flow path switching valve based on the control signal of the controller. In some examples, the controller can be configured to, based on the first humidity being greater than the second humidity, produce a first control signal to increase the first opening degree of the first outlet and decrease the second opening degree of the second outlet according to a first predetermined ratio, and transmit the first control signal to the first actuator. In some examples, the controller can be configured to, based on the second humidity being greater than the first humidity, produce a second control signal to increase the second opening degree of the second outlet and decrease the first opening degree of the first outlet according to a second predetermined ratio, and transmit the second control signal to the first actuator.

In some examples, the controller can be configured to, based on the first humidity being greater than the second humidity, produce a third control signal to increase a third opening degree of the first inlet and decrease a fourth opening degree of the second inlet according to a third predetermined ratio, and transmit the third control signal to the second actuator. In some examples, the controller can be configured to, based on the second humidity being greater than the first humidity, produce a fourth control signal to increase the fourth opening degree of the second inlet and decrease the third opening degree of the first inlet according to a fourth predetermined ratio, and transmit the fourth control signal to the second actuator.

According to another aspect, a method controls a laundry treatment apparatus including a cabinet that defines an accommodation space therein, a first laundry treatment module disposed in a first portion of the accommodation space, a second laundry treatment module disposed in a second portion of the accommodation space, and a drying module configured to produce hot air and to supply the hot air to the first laundry treatment module and the second laundry treatment module through a first outlet and a second outlet, respectively. The drying module is further configured to receive return air from the first laundry treatment module and the second laundry treatment module through a first inlet and a second inlet, respectively, and to absorb at least a part of moisture included in the return air. The method includes supplying the hot air to the first and second laundry treatment modules through the first and second outlets, respectively, absorbing at least a part of the moisture included in the return air received through the first and second inlets from the first and second laundry treatment modules, measuring a first humidity of the return air received through the first inlet and a second humidity of the return air received through the second inlet, determining a difference value between the first humidity and the second humidity, determining whether the difference value exceeds a predetermined threshold value, and based on the difference value exceeding the predetermined threshold value, adjusting a ratio of amounts of the hot air to be supplied to the first laundry treatment module and the second laundry treatment module by changing a first opening degree of the first outlet or a second opening degree of the second outlet, or both.

Implementations according to this aspect can include one or more of the following features. For example, the first humidity can be measured from the return air discharged from the first laundry treatment module by a first humidity sensor disposed adjacent to the first inlet, and the second humidity is measured from the return air discharged from the second laundry treatment module by a second humidity sensor disposed adjacent to the second inlet.

In some implementations, the method can include comparing each of the first humidity and the second humidity to a predetermined target humidity, and determining whether each of the first humidity and the second humidity is less than or equal to the predetermined target humidity. In some examples, the difference value can be calculated based on both of the first humidity and the second humidity exceeding the predetermined target humidity. In some examples, the predetermined target humidity can be a relative humidity of 60%. In some examples, the predetermined threshold value can be a relative humidity of 10%.

In some implementations, adjusting the ratio of the amounts of the hot air can include, based on the first humidity being greater than the second humidity, increasing the first opening degree of the first outlet and decreasing the second opening degree of the second outlet according to a first predetermined ratio, and based on the second humidity being greater than the first humidity, increasing the second opening degree of the second outlet and decreasing the first opening degree of the first outlet according to a second predetermined ratio.

In some implementations, adjusting the ratio of the amounts of the hot air can include, based on the first humidity being greater than the second humidity, increasing a third opening degree of the first inlet and decreasing a fourth opening degree of the second inlet according to a third predetermined ratio, and based on the second humidity being greater than the first humidity, increasing the fourth opening degree of the second inlet and decreasing the third opening degree of the first inlet according to a fourth predetermined ratio.

In some implementations, the method can further include supplying the hot air through the first and second outlets and absorbing at least a part of the moisture in the return air received through the first and second inlets after adjusting the ratio of the amounts of the hot air by changing at least one of the first opening degree of the first outlet, the second opening degree of the second outlet, the third opening degree of the first inlet, or the fourth opening degree of the second outlet.

In some implementations, the method can further include determining whether a predetermined time has elapsed since a start point of supplying the hot air through the first and second outlets after adjusting the ratio of the amounts of the hot air.

In some implementations, the method can further include, based on determining that the predetermined time has elapsed since the start point, repeating operations that include measuring the first humidity and the second humidity, comparing each of the first humidity and the second humidity to the predetermined target humidity, based on both of the first humidity and the second humidity exceeding the predetermined target humidity, calculating the difference value between the first humidity and the second humidity, and adjusting the ratio of the amounts of the hot air by changing at least one of the first opening degree of the first outlet, the second opening degree of the second outlet, the third opening degree of the first inlet, or the fourth opening degree of the second outlet.

DETAILED DESCRIPTION

Hereinafter, exemplary implementations of the present disclosure will be described in detail with reference to the accompanying drawings.

Figure 1:
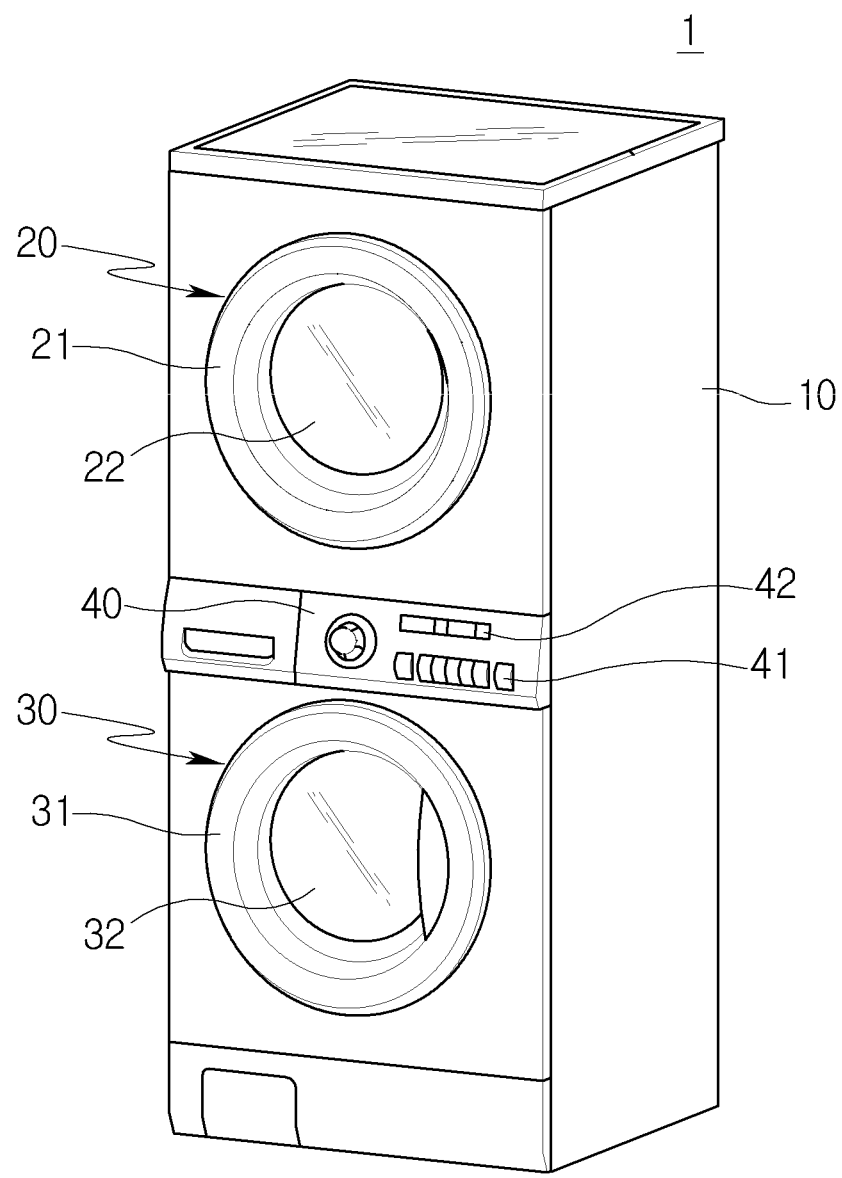
FIG. 1 is a perspective view of an example of an integrated laundry treatment apparatus.

FIG. 1 is a perspective view showing an example of an integrated laundry treatment apparatus 1. In some implementations, as illustrated in FIG. 1, the integrated laundry treatment apparatus 1 includes a common cabinet 10 that defines an external appearance of the integrated laundry treatment apparatus 1 and a common accommodation space therein, a first laundry treatment module 20 disposed at an upper side of the common accommodation space, a second laundry treatment module 30 disposed at a lower side of the common accommodation space, and a control panel 40 configured to define a front side of the common cabinet 10 and disposed between the first laundry treatment module 20 and the second laundry treatment module 30.

For example, the first and second laundry treatment modules 20 and 30, which are configured to independently perform the laundry treatment processes, can be installed by being integrally stacked in an upward/downward direction in the common cabinet 10, and the first and second laundry treatment modules 20 and 30 share at least some functional components. Therefore, it is possible to reduce a size, particularly, a size in a height direction of the laundry treatment apparatus in comparison with the related art in which a washing machine and a drying machine are merely stacked.

As illustrated, since the first and second laundry treatment modules 20 and 30 are disposed in the upward/downward direction, a front-loading integrated laundry treatment apparatus is suitable instead of a top-loading integrated laundry treatment apparatus. The first and second laundry treatment modules 20 and 30 respectively include first and second doors 21 and 31 disposed at the front side of the common cabinet 10.

A first drum 22 for treating the laundry is disposed inside the first door 21, and a second drum 32 for treating the laundry is disposed inside the second door 31.

The first and second laundry treatment modules 20 and 30 can perform the same laundry treatment process or different laundry treatment processes.

More specifically, a combination of an upper washing machine module and a lower washing machine module, a combination of an upper drying machine module and a lower drying machine module, a combination of an upper washing machine module and a lower drying machine module, and a combination of an upper drying machine module and a lower washing machine module can be applied.

However, the present disclosure is not limited thereto. Hereinafter, for convenience, an implementation will be described in which a drying machine module 20 is provided as the first laundry treatment module disposed at the upper side, and a washing machine is provided as the second laundry treatment module disposed at the lower side.

The control panel 40 is installed at the front side of the common cabinet 10 and disposed at a position between the drying machine module 20 and the washing machine module 30 in consideration of convenience and accessibility for a user's operation. As illustrated, the control panel 40 includes a manipulation unit 41 into which the user's operation command is inputted, and a display unit 42 configured to display current states of the drying machine module 20 and the washing machine module 30, a process performing situation, and the like. The control panel 40 is electrically connected to a controller 70 (control unit) to be described below, converts the user's operation command, which is inputted through the manipulation unit 41, into an electrical signal, and transmits the electrical signal to the controller 70. For example, the controller 70 can include a processor or an electric circuit.

Figure 2:
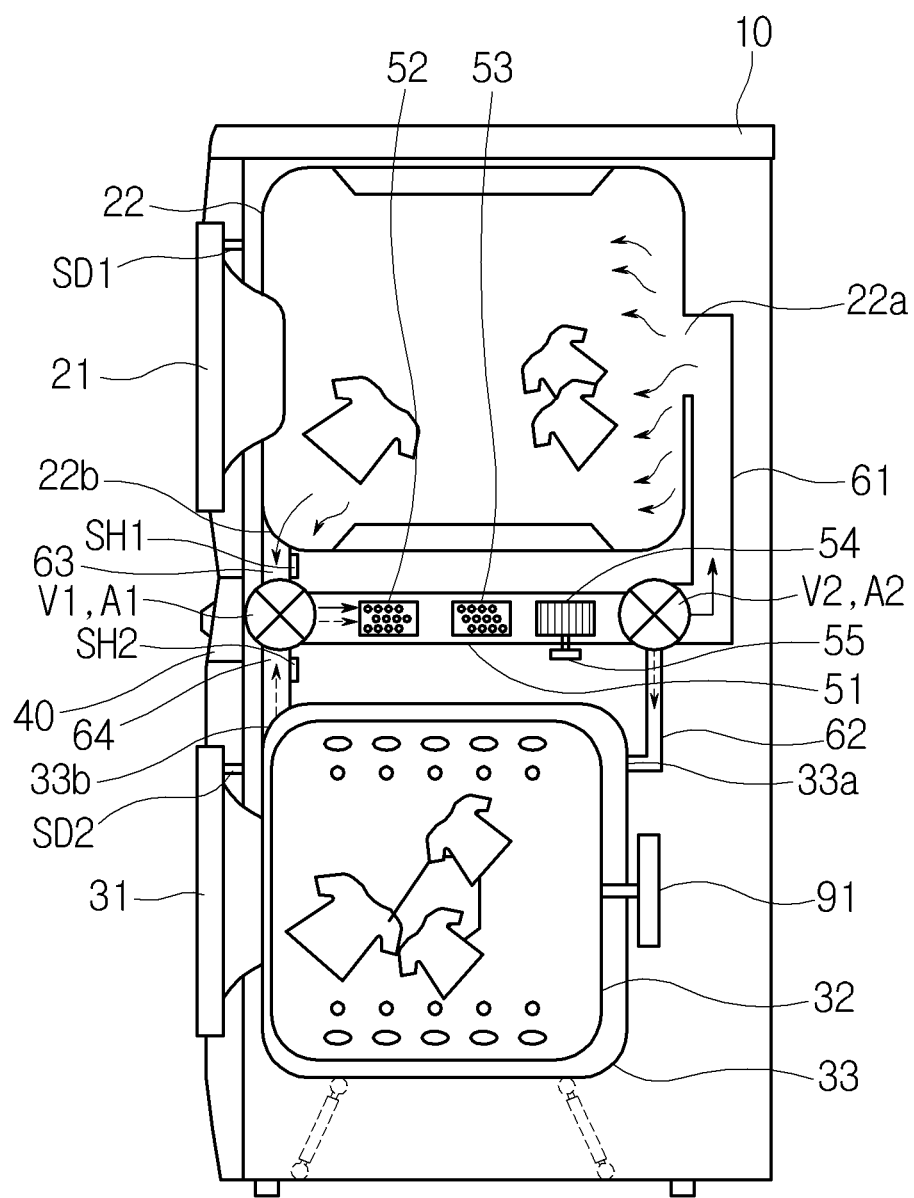
FIG. 2 is a schematic cross-sectional view of FIG. 1.

FIG. 2 is a schematic cross-sectional view of FIG. 1 and illustrates an example of a state in which dry hot air is supplied simultaneously to the drying machine module 20 and the washing machine module 30 through a common drying module 50.

As illustrated in FIG. 2, the integrated laundry treatment apparatus 1 includes the common drying module 50 configured to supply the hot air simultaneously or independently to the drying machine module 20 and the washing machine module 30 and absorb and remove at least a part of moisture included in the return air recovered from the drying machine module 20 and the washing machine module 30.

In some implementations, the common drying module 50 can include a common duct 51 having a common flow path therein. The common duct 51 has a first outlet 51c and a second outlet 51d provided to supply dry hot air to the drying machine module 20 and the washing machine module 30, and a first inlet 51a and a second inlet 51b provided to recover hot air from the drying machine module 20 and the washing machine module 30. As illustrated, a hot air supply flow path and a hot air recovery flow path can be disposed between the drying machine module 20 and the washing machine module 30 in the upward/downward direction and optimized to prevent a thermal loss, but the present disclosure is not limited thereto.

The first outlet 51c of the common drying module 50 is connected to one end of a first supply duct 61 for guiding the hot air discharged from the common duct 51 to the drying machine module 20, and the second outlet 51d of the common drying module 50 is connected to one end of a second supply duct 62 for guiding the hot air discharged from the common duct 51 to the washing machine module 30. That is, as illustrated, the hot air passing through the common duct 51 of the common drying module 50 is divided into hot air supply ducts including the first supply duct 61 and the second supply duct 62, and the first supply duct 61 and the second supply duct 62 are respectively connected to the drying machine module 20 and the washing machine module 30.

The other end of the first supply duct 61 is connected to the drying machine module 20, more specifically, an inlet port 22a of the drying drum 22, and the other end of the second supply duct 62 is connected to the washing machine module 30, more specifically, an inlet port 33a of a washing machine tub 33.

The first inlet 51a of the common drying module 50 is connected to one end of a first recovery duct 63 for guiding the hot air discharged from the drying machine module 20 to the common duct 51, and the second inlet 51b of the common drying module 50 is connected to one end of a second recovery duct 64 for guiding the hot air discharged from the washing machine module 30 to the common duct 51. That is, as illustrated, a flow path structure is formed such that the hot air recovered through the hot air recovery ducts including the first recovery duct 63 and the second recovery duct 64 is merged into the common duct 51.

The other end of the first recovery duct 63 is connected to a discharge port 22b of the drying drum 22, and the other end of the second recovery duct 64 is connected to a discharge port 33b of the washing machine tub 33.

In some examples, the integrated laundry treatment apparatus 1 can include a heater 53 configured to produce the hot air and a blower fan 54, where the heater 53 and the blower fan 54 can be disposed in the common duct 51. Further, the integrated laundry treatment apparatus 1 can include a condenser 52 disposed at an upstream side of the heater 53 based on a flow direction of the hot air and configured to remove at least a part of moisture included in the return air received from the drying machine module 20 and the washing machine module 30.

In some implementations, the integrated laundry treatment apparatus 1 can include a blower motor 55 installed outside the common duct 51 and disposed adjacent to the blower fan 54. The blower motor 55 can be configured to operate the blower fan 54. As illustrated, the blower fan 54 can receive driving power from the separate blower motor 55 dedicated to operating the blower fan 54. Alternatively, the blower fan 54 can receive driving power from a drive motor for the washing drum 32 or a drive motor for the drying drum 22. Hereinafter, for convenience, as illustrated, an implementation will be described in which the blower fan 54 is operated by the blower motor 55 dedicated to operating the blower fan 54.

For example, the heater 53 can include an electrothermal heater, a gas heater, a heat-pump-type condenser, or the like as a heat source. The condenser 52 can include a water-cooled dehumidification device, a heat-pump-type evaporator, or the like.

Hereinafter, for convenience, the heater 53 and the condenser 52, which are implemented as a heat pump module 80 will be described, but the present disclosure is not limited thereto.

In some examples, an outlet flow path switching valve V2 is installed at an outlet side of the common duct 51 and selectively opens at least any one of the first outlet 51c and the second outlet 51d or simultaneously opens the first outlet 51c and the second outlet 51d. An inlet flow path switching valve V1 is installed at an inlet side of the common duct 51 and selectively opens at least any one of the first inlet 51a and the second inlet 51b or simultaneously opens the first inlet 51a and the second inlet 51b.

As described below, the integrated laundry treatment apparatus 1 has at least four process modes.

The outlet flow path switching valve V2 serves to switch an outlet flow path of the common drying module 50 so that the hot air is supplied only to at least any one of the first outlet 51c and the second outlet 51d of the common duct 51 or the hot air is supplied to both the first outlet 51*c* and the second outlet 51*d* for the respective process modes.

Likewise, the inlet flow path switching valve V1 serves to switch an inlet flow path of the common drying module 50 so that the hot air is recovered only through at least any one of the first inlet 51*a* and the second inlet 51*b* of the common duct 51 or the hot air is recovered through both the first inlet 51*a* and the second inlet 51*b* for the respective process modes.

In addition, as described below, the outlet flow path switching valve V2 and the inlet flow path switching valve V1 can adjust opening degrees of the first and second inlets 51*a* and 51*b* and the first and second outlets 51*c* and 51*d* to control a flow rate of the hot air to be supplied to the drying machine module 20 and the washing machine module 30 in the process mode in which the hot air is supplied to both the drying machine module 20 and the washing machine module 30.

In some examples, the outlet flow path switching valve V2 and the inlet flow path switching valve V1 are respectively connected to valve actuators A1 and A2 for operating the outlet flow path switching valve V2 and the inlet flow path switching valve V1, and valve positions are controlled by the valve actuators A1 and A2, respectively.

For example, the outlet flow path switching valve V2 and the inlet flow path switching valve V1 are each provided in the form of a three-way valve. However, a various types of devices, which are capable of switching a 3-way flow path and adjusting opening degrees of the inlet and the outlet of the common drying module 50 for the respective process modes, can be applied as the outlet flow path switching valve V2, the inlet flow path switching valve V1, and the valve actuators A1 and A2. The modified examples belong to the scope of the present disclosure.

The detailed description of valve position control for the respective process modes will be made with reference to FIGS. 3 to 6.

Further, the integrated laundry treatment apparatus 1 includes a first humidity sensor SH1 configured to measure a first humidity of the hot air recovered through the first inlet 51*a*, and a second humidity sensor SH2 configured to measure a second humidity of the hot air recovered through the second inlet 51*b*.

The first humidity sensor SH1 serves to check a drying process state of the laundry in the drying drum 22 by measuring the humidity of the hot air discharged from the drying drum 22 of the drying machine module 20. The second humidity sensor SH1 serves to check a drying process state of the laundry in the washing drum 32 by measuring the humidity of the hot air discharged from the washing drum 32 and the tub 33 of the washing machine module 30.

The first humidity sensor SH1 and the second humidity sensor SH1 are electrically connected to the controller 70. A signal related to the first humidity measured by the first humidity sensor SH1 and a signal related to the second humidity measured by the second humidity sensor SH1 are periodically transmitted to the controller 70.

Therefore, the controller 70 can check the dried state of the laundry in the drying drum 22 and the washing drum 32 based on the first humidity and the second humidity while the drying machine module 20 and the washing machine module 30 simultaneously perform the drying processes. The controller 70 creates a control signal for switching the flow path based on the received first and second humidities so that a large amount of hot air can be supplied to a portion where the laundry is less dried, i.e., a portion where the hot air having a higher humidity is discharged. The controller 70 transmits the control signal to the valve actuators A1 and A2, and the actuators A1 and A2 operate the valves based on the corresponding control signal and adjust the opening degrees of the first and second inlets 51*a* and 51*b* and the opening degrees of the first and second outlets 51*c* and 51*d*.

The detailed configuration related to the process of controlling the opening degrees of the first and second inlets 51*a* and 51*b* and the opening degrees of the first and second outlets 51*c* and 51*d* based on the first and second humidities while the drying processes are simultaneously performed will be described below with reference to FIGS. 8 and 9.

In some examples, since the first humidity sensor SH1 and the second humidity sensor SH1 serve to check the dried state of the laundry in the drying drum 22 and the dried state of the laundry in the washing drum 32, the first humidity sensor SH1 and the second humidity sensor SH1 need to measure a state before a recovery flow path from the drying machine module 20 and a recovery flow path from the washing machine module 30 are merged. Therefore, the first humidity sensor SH1 and the second humidity sensor SH1 can be respectively installed in the first recovery duct 63 and the second recovery duct 64 and disposed adjacent to the first inlet 51*a* and the second inlet 51*b* at the upstream positions from the inlet flow path switching valve V1 based on the flow direction of the hot air.

The first humidity sensor SH1 and the second humidity sensor SH1 can be configured to measure a relative humidity in the air and convert the measured humidity into an electrical signal.

FIGS. 3 to 6 are schematic configuration views for explaining a state in which the dry hot air is supplied to the drying machine module 20 and the washing machine module 30 or a state in which the supply of the dry hot air is cut off for respective process modes.

As described above, the integrated laundry treatment apparatus 1 can have at least four process modes including first to fourth process modes based on supplied and recovered states of the dry hot air.

The first process mode is a process mode in which the drying machine module 20 performs the drying process singly and the washing machine module 30 is in a stopped state or performs the washing process. In the first process mode, the dry hot air is supplied only to the drying machine module 20.

The second process mode is a process mode in which the washing machine module 30 performs the drying process singly and the drying machine module 20 is in a stopped state. In the second process mode, the dry hot air is supplied only to the washing machine module 30.

The third process mode is a process mode in which the drying machine module 20 performs the drying process and, at the same time, the washing machine module 30 performs the washing process and then performs the drying process. In the third process mode, the dry hot air is supplied only to the drying machine module 20 while the washing machine module 30 performs the washing process. When the washing machine module 30 completes the washing process and performs the drying process, the hot air supply and recovery flow paths are switched by the outlet flow path switching valve V2 and the inlet flow path switching valve V1 so that the hot air can be simultaneously supplied to the drying machine module 20 and the washing machine module 30.

The fourth process mode is a process mode in which the drying machine module 20 and the washing machine module 30 simultaneously perform the drying processes and the dry hot air is simultaneously supplied to the drying machine module 20 and the washing machine module 30.

Figure 3:
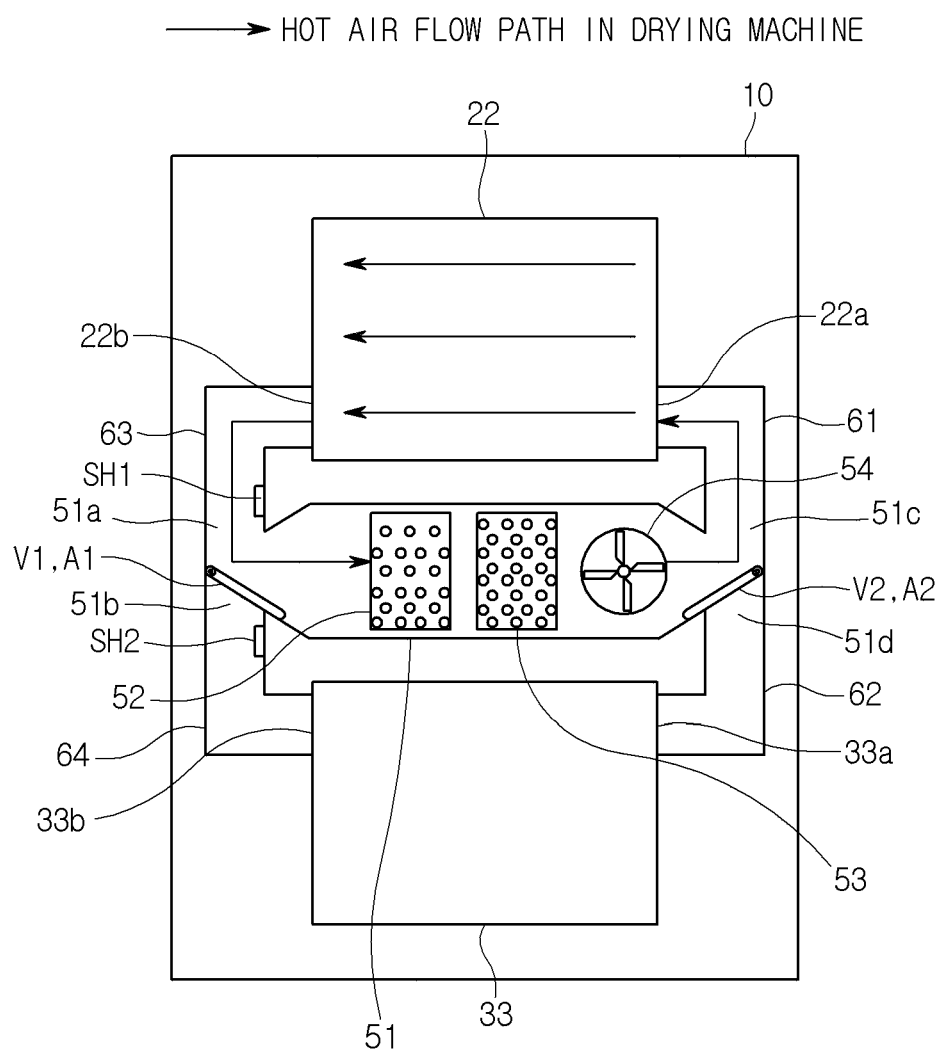
FIGS. 3 to 6 are schematic configuration views showing examples of a state in which dry hot air is supplied to a drying machine module and a washing machine module and a state in which a supply of dry hot air is cut off in respective process modes.

FIG. 3 illustrates an example of a state in which the dry hot air is supplied only to the drying machine module 20 in the first and third process modes. Referring to FIG. 3, the washing machine module 30 is in the stopped state in the first process mode, and the washing machine module 30 performs the washing process in the third process mode. Therefore, the dry hot air is not supplied to the washing machine module 30, the total amount of dry hot air is supplied only to the drying machine module 20, and the dry hot air is recovered from the drying machine module 20.

The outlet flow path switching valve V2 is operated by the valve actuator A2 to fully open the first outlet 51c of the common duct 51 and fully close the second outlet 51d of the common duct 51, and the inlet flow path valve is operated by the valve actuator A1 to fully open the first inlet 51a of the common duct 51 and fully close the second inlet 51b of the common duct 51, such that the dry hot air can be supplied only to the drying machine module 20 and the drying machine module 20 can perform the drying process singly. Therefore, as illustrated in FIG. 3, a single hot air circulation flow path is formed in respect to the drying machine module 20.

FIG. 3 illustrates an implementation in which the outlet flow path switching valve V2 and the inlet flow path switching valve V1, which are each a three-way valve, are each provided in the form of a flap valve. Hereinafter, for convenience, the implementation will be described in which the outlet flow path switching valve V2 and the inlet flow path switching valve V1 are each provided in the form of a flap valve, but the present disclosure is not limited thereto.

In some examples, the dried state of the laundry in the drying drum 22 is monitored in real time by the first humidity sensor SH1 while the dry hot air is supplied only to the drying machine module 20 by the common drying module 50 in the first and third process modes.

Therefore, as described below, when the controller 70 determines that the first humidity measured by the first humidity sensor SH1 reaches a relative humidity of 60%, for example, the controller 70 can perform control to complete the drying process in the drying machine module 20, thereby preventing the laundry from being excessively dried and reducing electric power consumption.

Figure 4:
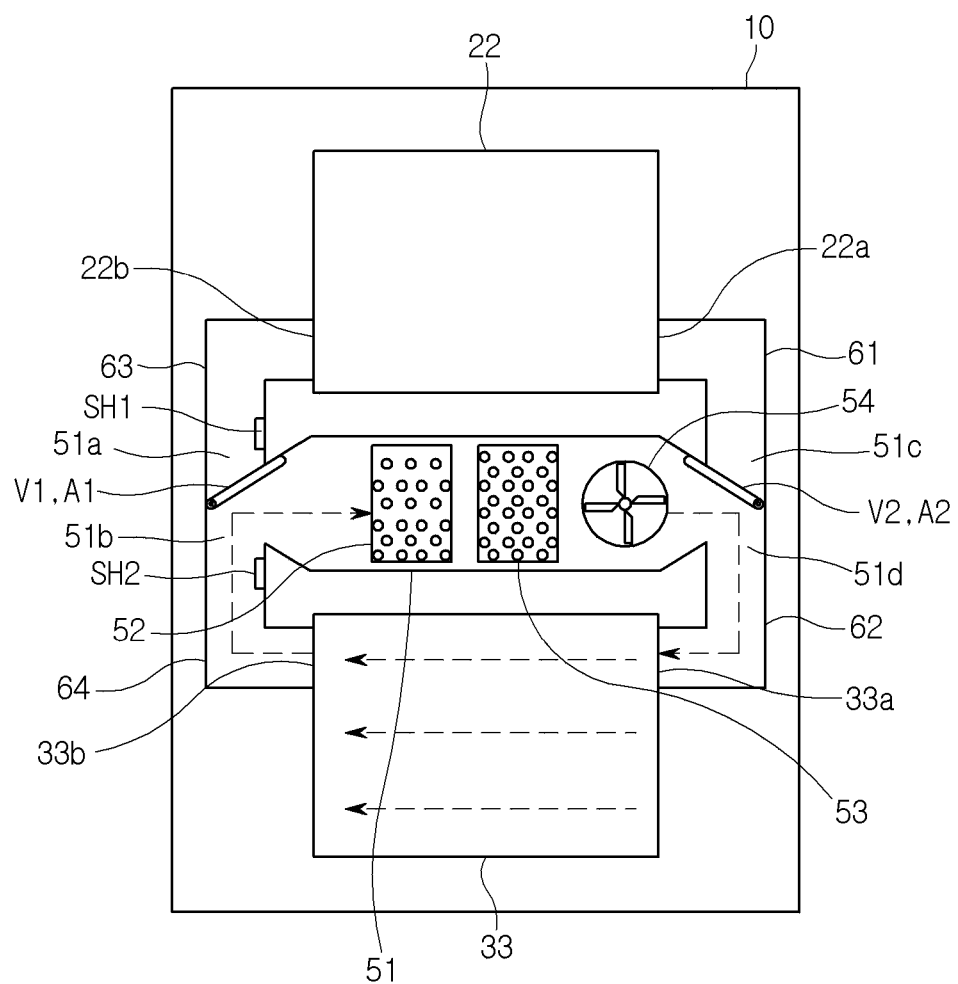

FIG. 4 illustrates an example of a state in which the dry hot air is supplied only to the washing machine module 30 in the second process mode. Referring to FIG. 4, since the drying machine module 20 is in the stopped state in the second process mode, the dry hot air is not supplied to the drying machine module 20, and the total amount of dry hot air is supplied only to the washing machine module 30.

The outlet flow path switching valve V2 is operated by the valve actuator A2 to fully close the first outlet 51c of the common duct 51 and fully open the second outlet 51d of the common duct 51, and the inlet flow path valve is operated by the valve actuator A1 to fully close the first inlet 51a of the common duct 51 and fully open the second inlet 51b of the common duct 51, such that the dry hot air can be supplied only to the washing machine module 30 and the washing machine module 30 can perform the drying process singly. Therefore, as illustrated in FIG. 4, a single hot air circulation flow path is formed in respect to the washing machine module 30.

The dried state of the laundry in the washing drum 32 is monitored in real time by the second humidity sensor SH1 in the same way as the first and third process modes while the dry hot air is supplied only to the washing machine module 30 by the common drying module 50 in the second process mode.

Therefore, as described below, when the controller 70 determines that the second humidity measured by the second humidity sensor SH1 reaches a relative humidity of 60%, for example, the controller 70 performs control to complete the drying process in the washing machine module 30, thereby preventing the laundry from being excessively dried and reducing electric power consumption.

Figure 5:
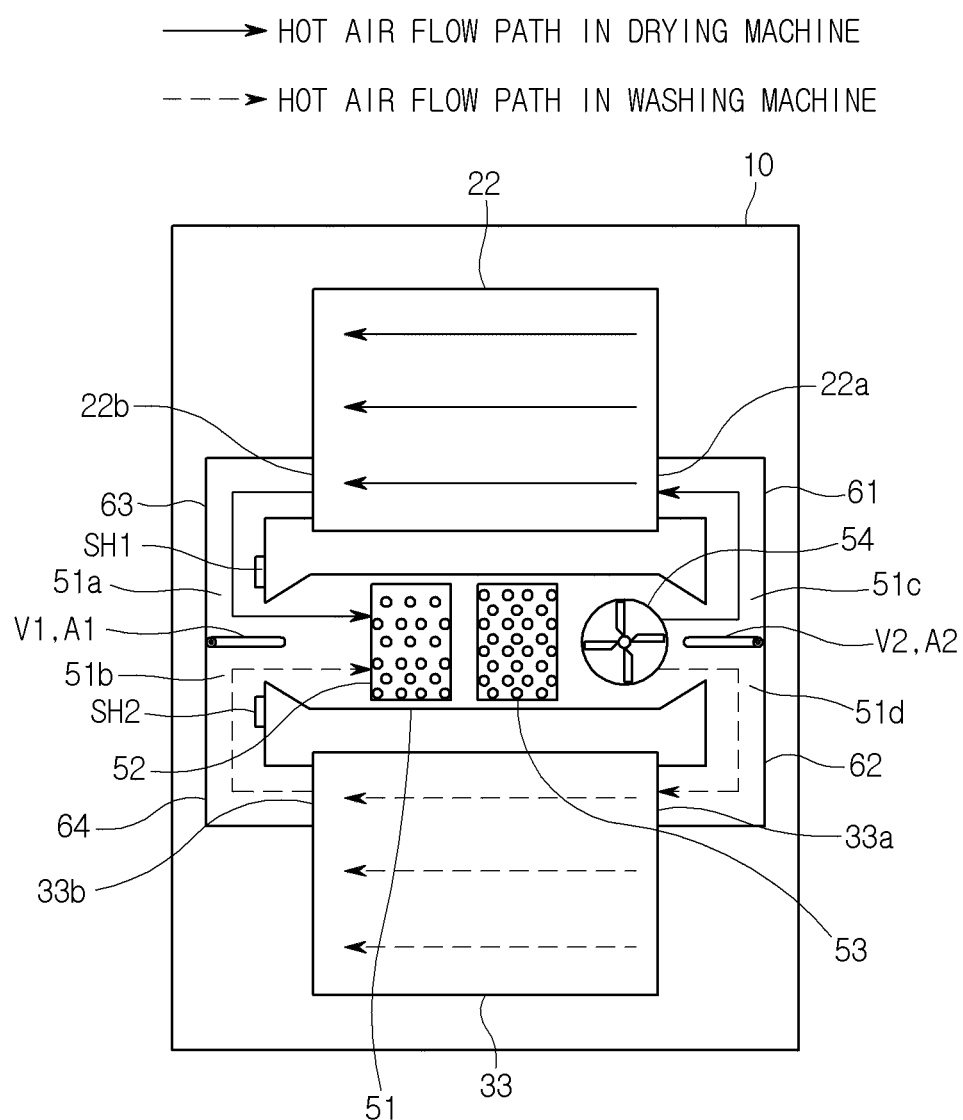

FIG. 5 illustrates an example of a state in which the dry hot air is simultaneously supplied to the drying machine module 20 and the washing machine module 30 in the third and fourth process modes.

Referring to FIG. 5, the dry hot air is simultaneously supplied to the drying machine module 20 and the washing machine module 30 and simultaneously recovered from the drying machine module 20 and the washing machine module 30 so that the washing process of the washing machine module 30 is completed and the drying process is performed while the drying machine module 20 performs the drying process in the third process mode or so that both the drying machine module 20 and the washing machine module 30 perform the drying processes in the fourth process mode.

The outlet flow path switching valve V2 is operated by the valve actuator A2 to at least partially open the first outlet 51c and the second outlet 51d of the common duct 51, and the inlet flow path valve is operated by the valve actuator A1 to at least partially open the first inlet 51a and the second inlet 51b of the common duct 51, such that the dry hot air can be simultaneously supplied to the drying machine module 20 and the washing machine module 30, and the drying machine module 20 and the washing machine module 30 can simultaneously perform the drying processes. Therefore, as illustrated in FIG. 4, hot air circulation flow paths are formed in respect to the drying machine module 20 and the washing machine module 30.

As illustrated in FIG. 5, the outlet flow path switching valve V2 is controlled so that the first outlet 51c and the second outlet 51d of the common duct 51 have the same opening degree, and the inlet flow path switching valve V1 is controlled so that the first inlet 51a and the second inlet 51b of the common duct 51 have the same opening degree, such that the dry hot air is supplied basically at the same flow rate to the drying drum 22 and the washing drum 32 while the drying drum 22 and the washing drum 32 simultaneously perform the drying process.

However, in a situation in which a large amount of dry hot air needs to be supplied to the drying machine module 20 such as a case in which the amount of laundry in the drying drum 22 is larger than the amount of laundry in the washing drum 32 and a case in which the washing drum 32 is sterilized and disinfected, the outlet flow path switching valve V2 and the inlet flow path switching valve V1 can be controlled so that the opening degree of the first inlet 51a is larger than the opening degree of the second inlet 51b and the opening degree of the first outlet 51c is larger than the opening degree of the second outlet 51d, such that a larger amount of dry hot air can be supplied to the drying drum 22 and recovered from the drying drum 22.

In some examples, the dried state of the laundry in the drying drum 22 and the dried state of the laundry in the washing drum 32 are respectively monitored in real time by the first humidity sensor SH1 and the second humidity sensor SH1 while the dry hot air is simultaneously supplied to the drying machine module 20 and the washing machine module 30 by the common drying module 50 while the drying machine module 20 and the washing machine module 30 simultaneously perform the drying processes.

As described below, when the controller 70 determines that at least any one of the first humidity and the second humidity measured by the first humidity sensor SH1 and the second humidity sensor SH1 reaches a predetermined relative humidity, for example, when the controller 70 determines that the first humidity reaches a relative humidity of 60% and the second humidity is lower than a relative humidity of 60%, the controller 70 can switch the outlet flow path switching valve V2 and the inlet flow path switching valve V1 to the states illustrated in FIG. 4 so that the drying process in the drying machine module 20 is stopped and the total amount of dry hot air is transmitted to the washing machine module 30, thereby preventing the laundry in the drying drum 22 from being excessively dried and reducing electric power consumption.

In some examples, when the controller 70 determines that the second humidity reaches a relative humidity of 60% and the first humidity is lower than a relative humidity of 60%, the controller 70 switches the outlet flow path switching valve V2 and the inlet flow path switching valve V1 to the states illustrated in FIG. 3 so that the drying process in the washing machine module 30 is stopped and the total amount of dry hot air is transmitted to the drying machine module 20.

In some examples, there can occur a case in which the simultaneous drying processes are entirely further delayed than expected when a deviation between the first humidity and the second humidity is severe during the simultaneous drying processes even though both the first humidity and the second humidity are lower than the relative humidity of 60%.

To prevent the delay, the controller 70 calculates a difference value between the first humidity and the second humidity. When the controller 70 determines that the corresponding difference value exceeds a predetermined threshold value, particularly, a relative humidity of 10%, the controller 70 performs control to switch the state of the outlet flow path switching valve V2 and the state of the inlet flow path switching valve V1 so that a larger amount of hot air can be supplied to one of the drying machine module 20 and the washing machine module 30 from which the hot air having a higher humidity is discharged.

For example, when the controller 70 determines that the first humidity is higher than the second humidity by a relative humidity of 10%, the controller 70 controls the outlet flow path switching valve V2 to increase the opening degree of the first outlet 51c of the common duct 51 by a predetermined ratio and decrease the opening degree of the second outlet 51d by the predetermined ratio, and the controller 70 controls the inlet flow path switching valve V1 to adjust the opening degrees of the first inlet 51a and the second inlet 51b of the common duct 51 by the same predetermined ratio.

In this case, the predetermined ratio by which the opening degrees of the first and second inlets 51a and 51b and the first and second outlets 51c and 51d of the common duct 51 are adjusted can be about 5%.

As described above, the opening degrees of the first and second inlets 51a and 51b and the first and second outlets 51c and 51d of common duct 51 can be adjusted and the amount of dry hot air can be differently controlled based on the deviation between the first humidity and the second humidity, thereby minimizing electric power consumption caused when the simultaneous drying processes are entirely delayed.

The detailed contents related to the measurement of the first humidity and the second humidity during the simultaneous drying processes and the detailed contents related to control of the outlet flow path switching valve V2 and the inlet flow path switching valve V1 will be described below with reference to FIG. 9A and FIG. 9B.

Figure 6:
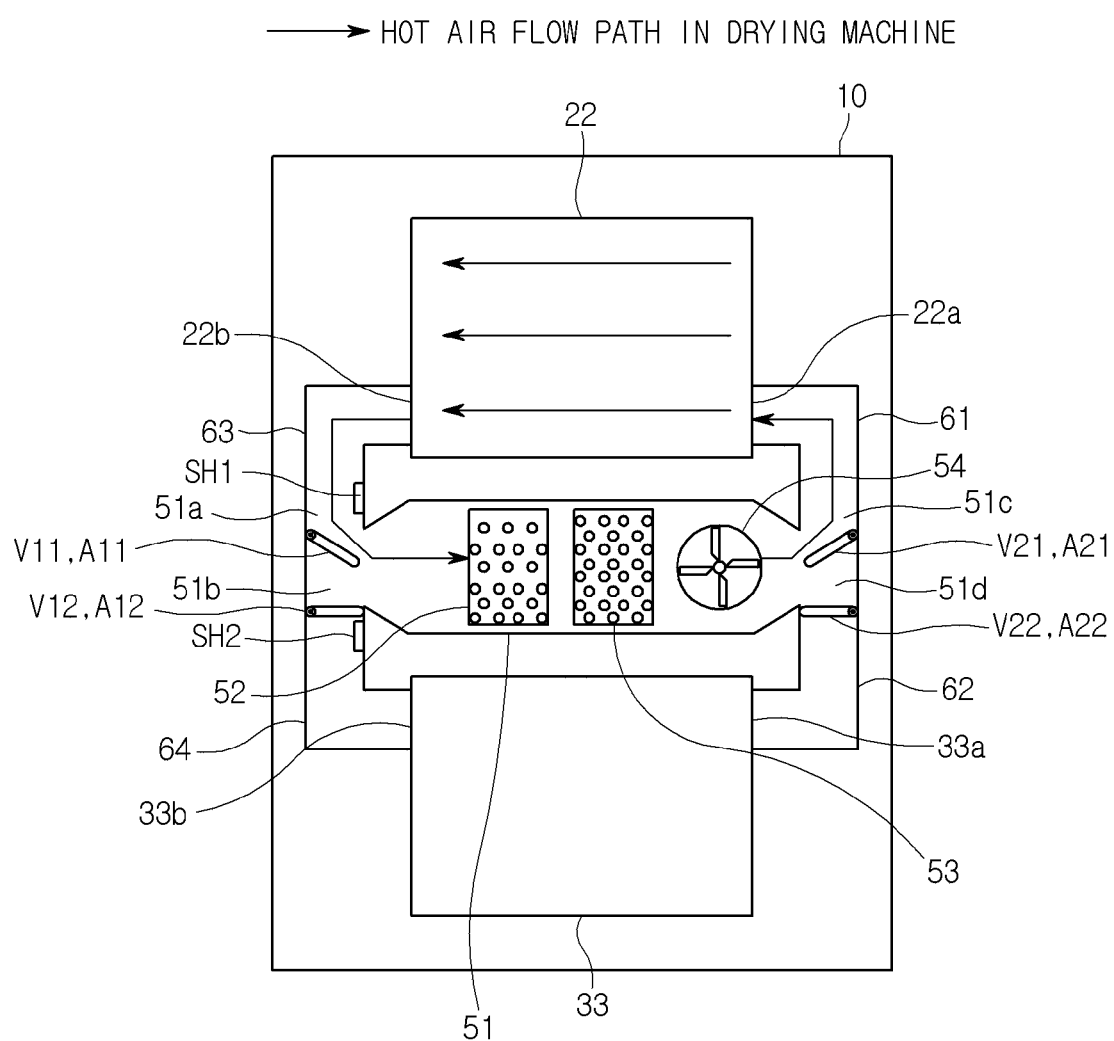

FIG. 6 illustrates an example of the integrated laundry treatment apparatus 1 in which the inlet flow path switching valve V1 and the outlet flow path switching valve V2 each include two valves.

As illustrated in FIG. 6, the inlet flow path switching valve V1 includes a first inlet flow path switching valve V11 dedicated to opening or closing the first inlet 51a, and a second inlet flow path switching valve V12 dedicated to opening or closing the second inlet 51b.

Further, the outlet flow path switching valve V2 includes a first outlet flow path switching valve V21 dedicated to opening or closing the first outlet 51c, and a second outlet flow path switching valve V22 dedicated to opening or closing the second outlet 51d.

In some examples, as shown in FIGS. 3 to 5, the first and second inlets 51a and 51b may not be simultaneously closed and the first, and second outlets 51c and 51d may not be simultaneously closed. In some examples, as shown in FIG. 6, the drying machine hot air flow paths and the washing machine hot air flow paths can be simultaneously closed.

Since the hot air flow paths are simultaneously closed as described above, it is possible to remove lint and dust produced during the drying processes in the drying machine module 20 and the washing machine module 30 and accumulated on the condenser 52. Further, it is possible to prevent lint and dust, which remain while the condenser 52 is cleaned, from entering the washing drum 32 or the drying drum 22 again and contaminating the washing drum 32 or the drying drum 22.

The first outlet flow path switching valve V21 and the second outlet flow path switching valve V22 are respectively operated by dedicated valve actuators V21 and V22, and the first inlet flow path switching valve V11 and the second inlet flow path switching valve V12 are respectively operated by dedicated valve actuators V11 and V12.

Figure 7:
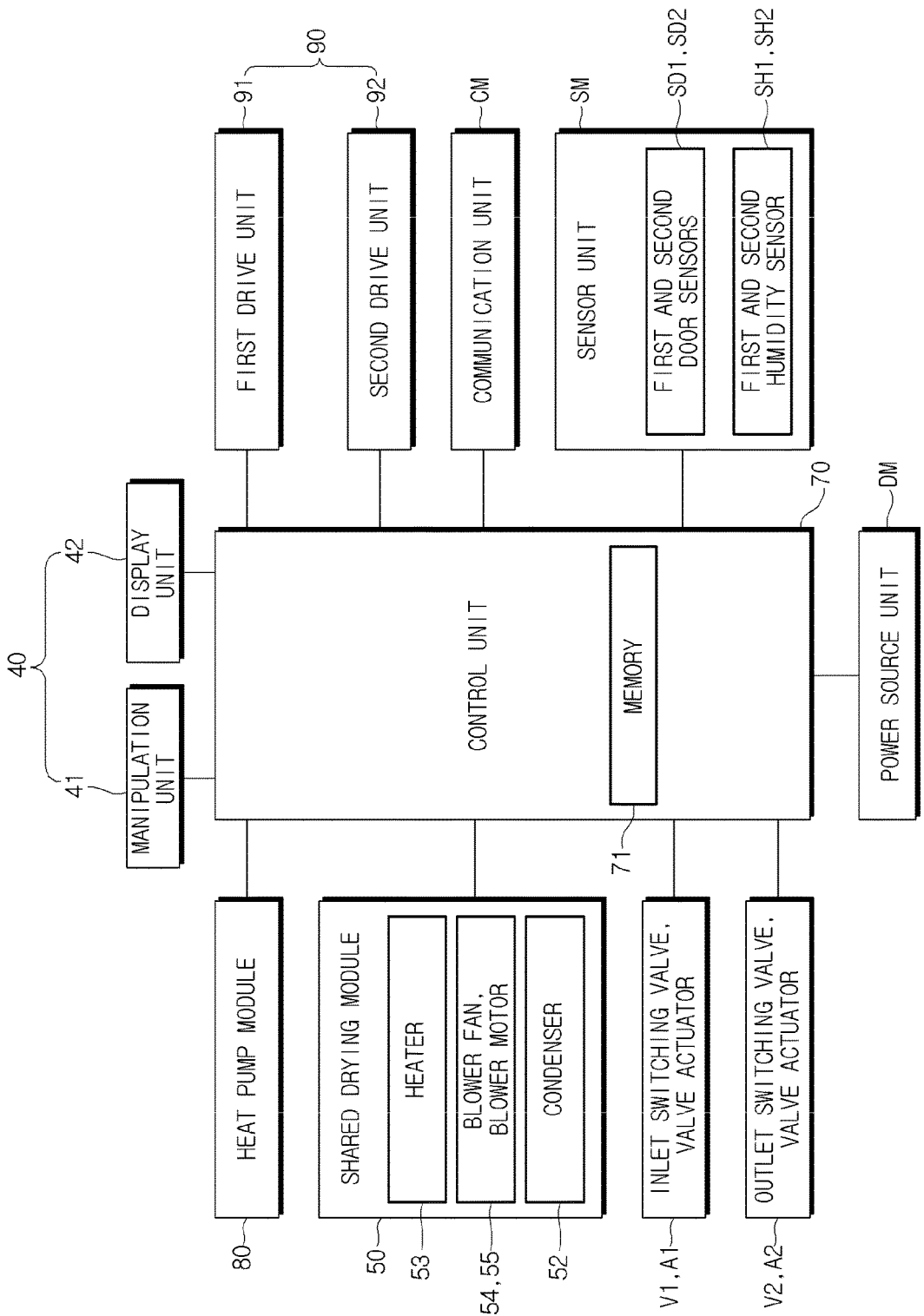
FIG. 7 is a functional block diagram showing an example of a controller of the integrated laundry treatment apparatus.
Figure 8:
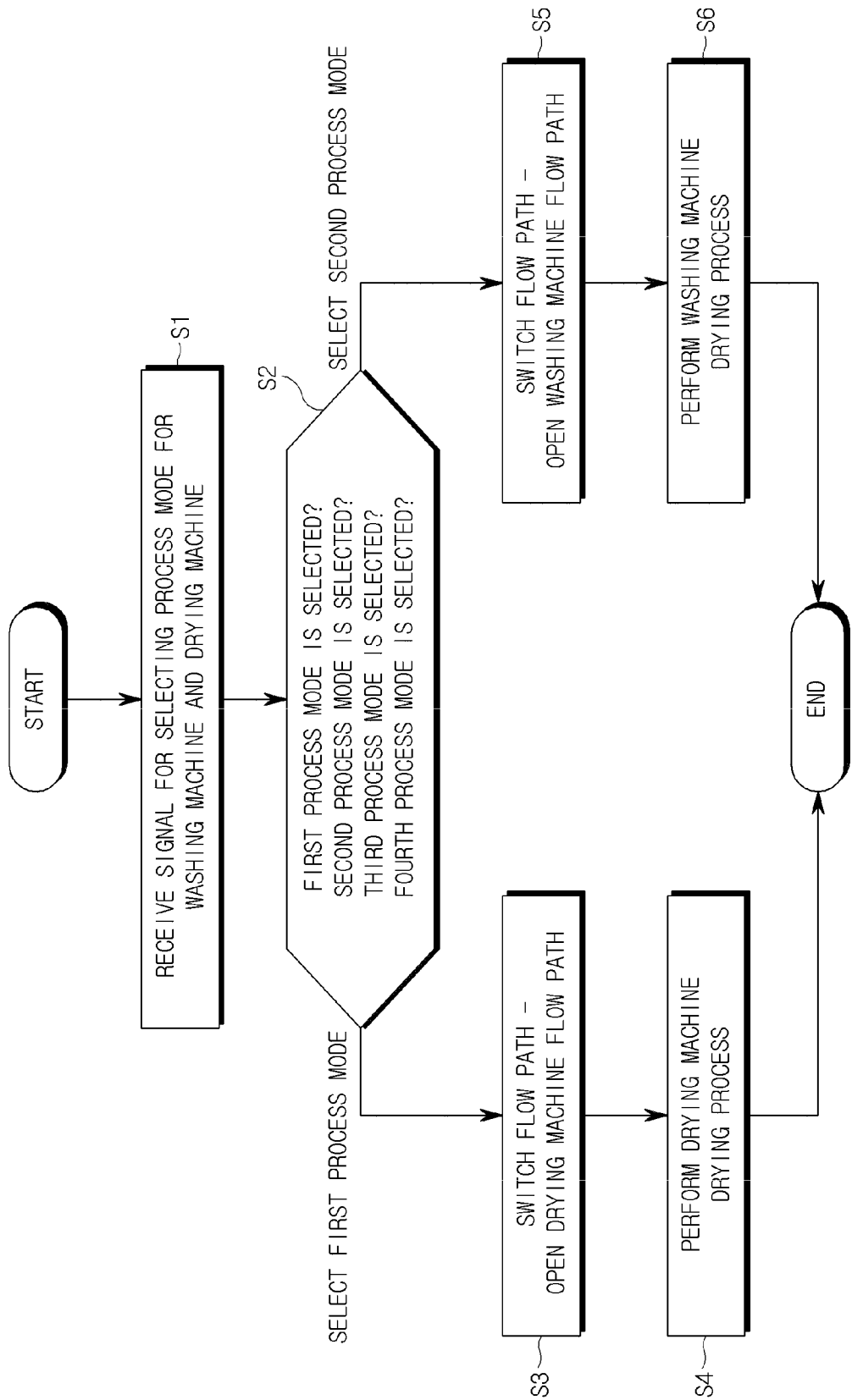
FIGS. 8 to 9 are flow charts showing an example of a method for controlling the integrated laundry treatment apparatus.

FIG. 7 is an example of a functional block diagram representing the controller 70 of the integrated laundry treatment apparatus 1, and FIGS. 8 to 9 are flow charts related to an example method for controlling the integrated laundry treatment apparatus 1.

Hereinafter, the method of controlling the integrated laundry treatment apparatus 1 will be described focusing on the controller 70 illustrated in FIG. 7.

In some implementations, as illustrated in FIG. 8, the controller can perform a process mode selection signal receiving step S1 of receiving a signal for selecting at least any one of the process modes at least including the first to fourth process modes.

In the process mode selection signal receiving step S1, the controller 70 receives the signal for selecting the first to fourth process modes based on a selection command physically inputted from the manipulation unit 41 of the control panel 40 illustrated in FIG. 7. Alternatively, the controller 70 can receive the signal for selecting any one of the first to fourth process modes based on a selection command inputted in a wireless manner through a communication unit CM instead of the control panel 40. The communication unit CM is connected to a user mobile device through any wireless communication.

Then, the controller 70 performs a process mode determining step S2 of determining which process mode is selected among the first to fourth process modes based on the received selection signal.

In this case, the controller 70 can provide the user with information indicating that a particular process mode is selected through the user mobile device or the display unit 42 illustrated in FIG. 7.

When the determination result indicates that the first process mode is selected in the process mode determining step S2, the controller 70 performs a drying machine hot air flow path opening step S3 of opening the drying machine hot air flow path as a preparation step for allowing the drying machine module 20 to perform the drying process singly.

In the drying machine hot air flow path opening step S3, the controller 70 produces the control signal for fully opening the first inlet 51*a* and the first outlet 51*c* of the common duct 51 and fully closing the second inlet 51*b* and the second outlet 51*d* of the common duct 51, like the state illustrated in FIG. 3, and transmits the control signal to the valve actuators A1 and A2 illustrated in FIG. 7.

When the drying machine hot air flow path opening step S3 is completed, the controller 70 performs a drying machine drying process performing step S4 of performing the drying process in the drying machine module 20.

In the drying machine drying process performing step S4, the controller 70 can check whether the first door 21 of the drying machine module 20 is closed from a sensor for the first door 21 of a sensor unit SM illustrated in FIG. 7 before supplying electric power to a first drive unit 91 of a drive unit 90 for operating the drying drum 22.

When the checking result indicates that the first door 21 is closed, the controller 70 can detect the amount of laundry by initially operating the drying drum 22 by supplying electric power from a power source unit PM to the first drive unit 91.

The controller 70 can compare the detected amount of laundry with drying time data for the respective amounts of laundry stored in advance in a memory 71 and transmit information on expected drying process time to the display unit 42 or the user mobile device.

In this case, when the expected drying process time is determined by initially operating the first drive unit 91, the controller 70 performs control to produce the dry hot air by supplying the electric power to the heat pump module 80 and the blower motor 55 of the common drying module 50.

In some examples, since the washing machine module 30 is in a stopped state in the first process mode, the controller 70 performs control not to supply electric power from the power source unit PM to a second drive unit 92 of the drive unit 90 for operating the washing drum 32.

In some examples, when the determination result indicates that the second process mode is selected in the process mode determining step S2, the controller 70 performs a washing machine hot air flow path opening step S5 of opening the washing machine hot air flow path as a preparation step of allowing the washing machine module 30 to perform the drying process singly, as illustrated in FIG. 8.

In the washing machine hot air flow path opening step S5, the controller 70 produces the control signal for fully opening the second inlet 51*b* and the second outlet 51*d* of the common duct 51 and fully closing the first inlet 51*a* and the first outlet 51*c* of the common duct 51, like the state illustrated in FIG. 4, and transmits the control signal to the valve actuators A1 and A2 illustrated in FIG. 7.

When the washing machine hot air flow path opening step S5 is completed, the controller 70 performs a washing machine drying process performing step S6 of performing the drying process in the washing machine module 30.

In the washing machine drying process performing step S6, the controller 70 can check whether the second door 31 of the washing machine module 30 is closed from a sensor for the second door 31 illustrated in FIG. 7 before supplying electric power to the second drive unit 92 for operating the washing drum 32.

When the checking result indicates that the second door 31 is closed, the controller 70 can detect the amount of laundry by initially operating the washing drum 32 by supplying electric power from the power source unit PM to the second drive unit 92.

The controller 70 can compare the detected amount of laundry with drying time data for the respective amounts of laundry stored in advance in a memory 71 and transmit information on expected drying process time to the display unit 42 or the user mobile device. The expected drying process time of the washing machine module 30 can be different from the drying process time of the drying machine module 20.

In this case, when the expected drying process time is determined by initially operating the second drive unit 92, the controller 70 performs control to produce the dry hot air by supplying the electric power to the heat pump module 80 and the blower motor 55 of the common drying module 50.

In some examples, since the drying machine module 20 is in a stopped state in the second process mode, the controller 70 performs control not to supply electric power from the power source unit PM to the first drive unit 91 for operating the drying drum 22.

Figure 9A:
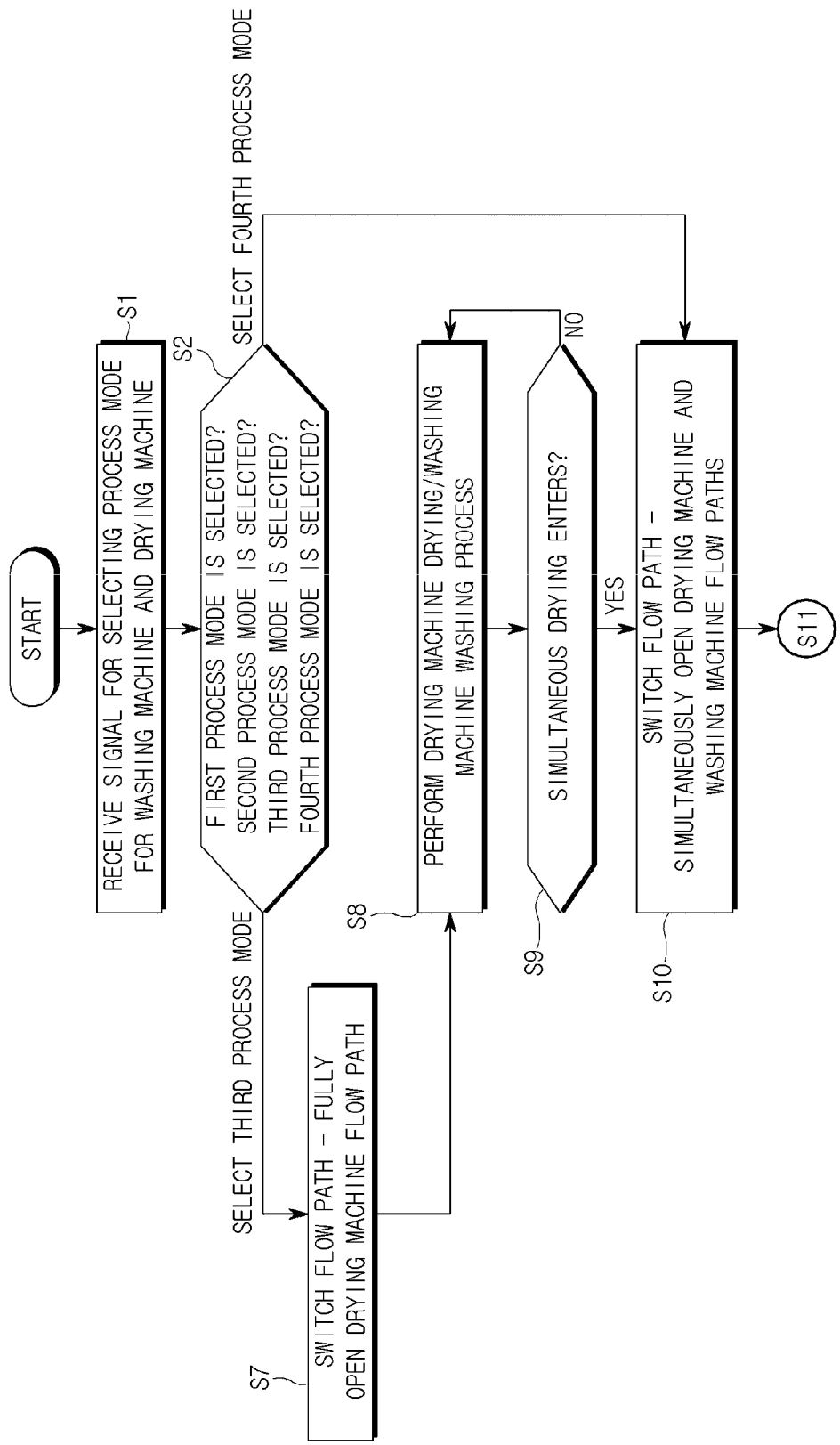
Figure 9B:
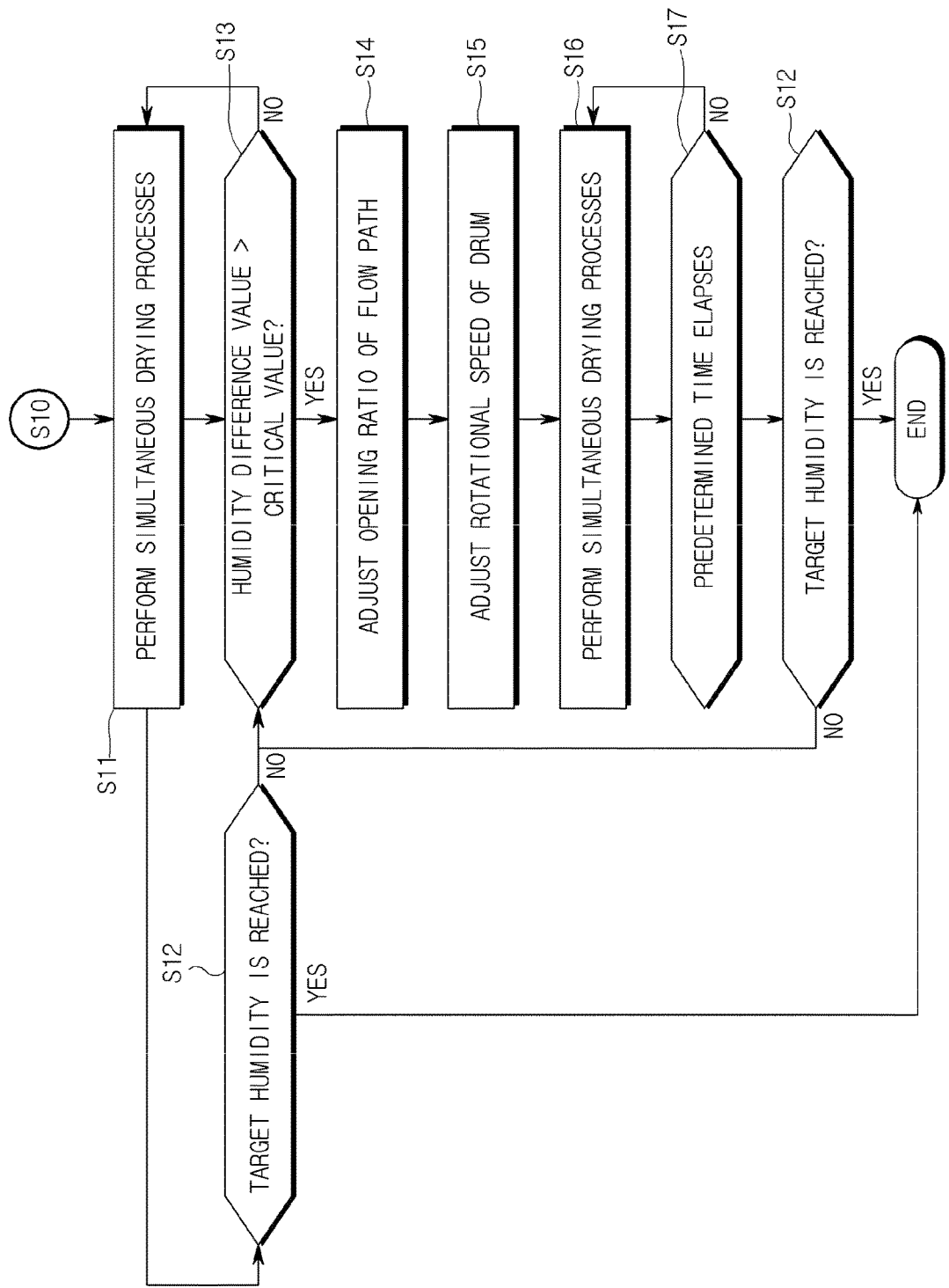

FIG. 9A and FIG. 9B illustrate example steps to be performed by performing the third or fourth process mode among the first to fourth process modes.

As illustrated in FIG. 9A and FIG. 9B, when the determination result indicates that the third process mode is selected in the process mode determining step S2, the controller 70 performs a drying machine hot air flow path opening step S7 of opening the drying machine hot air flow path as a preparation step for allowing the drying machine module 20 to perform the drying process singly.

The drying machine hot air flow path opening step S7 is performed basically in the same way as the drying machine hot air flow path opening step S3 performed when the first process mode is selected. The controller 70 produces the control signal for fully opening the first inlet 51*a* and the first outlet 51*c* of the common duct 51 and fully closing the second inlet 51*b* and the second outlet 51*d* of the common duct 51 so that the hot air flow path is created only for the drying machine module 20, and the controller 70 can transmit the control signal to the valve actuators A1 and A2 illustrated in FIG. 7.

When the drying machine hot air flow path opening step S7 is completed, the controller 70 can perform a drying machine drying/washing machine washing process performing step S8 of performing the drying process in the drying machine module 20 and the washing process in the washing machine module 30.

In the drying machine drying/washing machine washing process performing step S8, the controller 70 can check whether the first door 21 and the second door 31 are closed from the sensor for the first door 21 and the sensor for the second door 31 illustrated in FIG. 7 before supplying electric power to the first drive unit 91 and the second drive unit 92.

When the checking result indicates that the first door 21 and the second door 31 are closed, the controller 70 can detect the amount of laundry in the drying drum 22 and the amount of laundry in the washing drum 32 by initially operating the drying drum 22 and the washing drum 32 by supplying electric power from the power source unit PM to the first drive unit 91 and the second drive unit 92.

The controller 70 can compare the detected amount of dried laundry with drying time data for the respective amounts of dried laundry stored in advance in the memory 71 and transmits information on expected drying process time of the drying machine module 20 to the display unit 42 or the user mobile device. Further, the controller 70 can compare the detected amount of washed laundry with drying time data for the respective amounts of washed laundry stored in advance in the memory 71 and transmit information on expected washing process time of the washing machine module 30 to the display unit 42 or the user mobile device.

Thereafter, when the expected drying process time of the drying machine module 20 is determined by initially operating the first drive unit 91, the controller 70 performs control to produce the dry hot air by supplying the electric power to the heat pump module 80 and the blower motor 55 of the common drying module 50.

Next, the controller 70 performs a simultaneous drying processes entering determining step S9 of determining whether the washing process in the washing machine module 30 is completed, whether to supply the dry hot air to the washing machine module 30, and whether the simultaneous drying processes enter.

More specifically, whether the washing process in the washing machine module 30 is completed is determined during the drying process in the drying machine module 20.

If the controller 70 determines that the drying process in the drying machine module 20 is completed in a state in which the washing process in the washing machine module 30 is not completed, the controller 70 stops the drying process in the drying machine module 20 and continuously performs the washing process in the washing machine module 30.

In addition, when the washing process in the washing machine module 30 is completed and the drying process in the washing machine module 30 is intended to be performed after the drying process in the drying machine module 20 is completed, the controller 70 performs control to perform the washing machine hot air flow path opening step S5 of opening the washing machine hot air flow path illustrated in FIG. 8 and perform the washing machine drying process performing step S6.

In some examples, when the washing process in the washing machine module 30 is completed and the drying process in the washing machine module 30 is intended to be performed in a state in which the drying process in the drying machine module 20 is being performed, the controller 70 performs a drying machine/washing machine hot air flow path simultaneous opening step S10 of simultaneously opening the drying machine hot air flow path and the washing machine hot air flow path as a preparation step for simultaneously performing the drying processes in the drying machine module 20 and the washing machine module 30.

In the drying machine/washing machine hot air flow path simultaneous opening step S10, the controller 70 can produce the control signal for fully opening the first and second inlets 51a and 51b and the first and second outlets 51c and 51d of the common duct 51 so that the hot air flow paths can be simultaneously created for the drying machine module 20 and the washing machine module 30, and the controller 70 can transmit the control signal to the valve actuators A1 and A2 illustrated in FIG. 7.

As illustrated in FIG. 5, the outlet flow path switching valve V2 is operated by the valve actuator A2 to at least partially open the first outlet 51c and the second outlet 51d of the common duct 51, and the inlet flow path valve is operated by the valve actuator A1 to at least partially open the first inlet 51a and the second inlet 51b of the common duct 51, such that the dry hot air can be simultaneously supplied to the drying machine module 20 and the washing machine module 30, and the drying machine module 20 and the washing machine module 30 can simultaneously perform the drying processes.

As described above, the outlet flow path switching valve V2 is controlled so that the first outlet 51c and the second outlet 51d of the common duct 51 have the same opening degree, and the inlet flow path switching valve V1 is controlled so that the first inlet 51a and the second inlet 51b of the common duct 51 have the same opening degree, such that the dry hot air is supplied basically at the same flow rate to the drying drum 22 and the washing drum 32 while the drying drum 22 and the washing drum 32 simultaneously perform the drying process.

In some examples, when the drying machine/washing machine hot air flow path simultaneous opening step S10 is completed as described above, the controller 70 performs a drying machine/washing machine simultaneous drying processes performing step S11 of performing the drying processes simultaneously in the drying machine module 20 and the washing machine module 30.

During the simultaneous drying processes performing step S11, the controller 70 performs a humidity measuring step S12 of measuring, in real time, a relative humidity of the hot air recovered through the first inlet 51a and the second inlet 51b of the common drying module 50.

More specifically, in the humidity measuring step S12, the controller 70 performs a first humidity measuring step of measuring, in real time, the first humidity by using the first humidity sensor SH1 to check the dried state of the laundry in the drying drum 22, and a first humidity measuring step of measuring, in real time, the second humidity by using the second humidity sensor SH1 to check the dried state of the laundry in the washing drum 32.

In this case, when the controller 70 determines that at least any one of the first humidity and the second humidity measured by the first humidity sensor SH1 and the second humidity sensor SH1 reaches a predetermined target humidity, for example, when the controller 70 determines that the first humidity reaches a relative humidity of 60% and the second humidity is lower than a relative humidity of 60%, the controller 70 can switch the outlet flow path switching valve V2 and the inlet flow path switching valve V1 to the states illustrated in FIG. 4 so that the drying process in the drying machine module 20 is stopped and the total amount of dry hot air is transmitted to the washing machine module 30, thereby preventing the laundry in the drying drum 22 from being excessively dried and reducing electric power consumption.

In some examples, when the controller 70 determines that the second humidity reaches a relative humidity of 60% and the first humidity is lower than a relative humidity of 60%, the controller 70 performs control to switch the outlet flow path switching valve V2 and the inlet flow path switching valve V1 to the states illustrated in FIG. 3 so that the drying process in the washing machine module 30 is stopped and the total amount of dry hot air is transmitted to the drying machine module 20.

In some examples, there can occur a case in which the simultaneous drying processes are entirely further delayed than expected when a deviation between the first humidity and the second humidity is severe during the simultaneous drying processes even though both the first humidity and the second humidity are lower than the relative humidity of 60%.

In some implementations, the controller 70 can perform a humidity difference value determining step S13 of calculating a difference value between the first humidity and the second humidity and determining whether the corresponding difference value exceeds a predetermined threshold value, particularly, a relative humidity of 10%.

In the humidity difference value determining step S13, when the determination result indicates that the difference value between the first humidity and the second humidity does not exceed the predetermined threshold value, the controller 70 perform control to continuously perform the drying time drying machine/washing machine simultaneous drying processes performing step S11 until the first humidity and the second humidity reach a target humidity.

However, in the humidity difference value determining step S13, when the determination result indicates that the difference value between the first humidity and the second humidity exceeds the predetermined threshold value, the controller 70 performs a flow path opening ratio adjusting step S14 of adjusting a ratio of the hot air supplied to the drying machine module 20 and the washing machine module 30 by changing the opening degrees of the first outlet 51c and the second outlet 51d of the common duct 51.

In the flow path opening ratio adjusting step S14, the controller 70 performs control to switch the state of the outlet flow path switching valve V2 and the state of the inlet flow path switching valve V1 so that a larger amount of hot air can be supplied to one of the drying machine module 20 and the washing machine module 30 from which the hot air having a higher humidity is discharged.

For example, when the controller 70 determines that the first humidity is higher than the second humidity by a relative humidity of 10%, the controller 70 controls the outlet flow path switching valve V2 to increase the opening degree of the first outlet 51c of the common duct 51 by a predetermined ratio and decrease the opening degree of the second outlet 51d by the predetermined ratio, and the controller 70 controls the inlet flow path switching valve V1 to adjust the opening degrees of the first inlet 51a and the second inlet 51b of the common duct 51 by the same predetermined ratio.

In this case, the predetermined ratio by which the opening degrees of the first and second inlets 51a and 51b and the first and second outlets 51c and 51d of the common duct 51 are adjusted can be about 5%.

In some examples, in a case in which the difference value between the first humidity and the second humidity is a difference value larger than the predetermined threshold value, i.e., a relative humidity of 10%, for example, a difference value equal to or larger than a relative humidity of 15%, a drum rotational speed adjusting step S15 of increasing a rotational speed of the drum of one of the drying machine module 20 and the washing machine module 30 from which the hot air having a higher humidity is discharged can be performed in addition to the flow path opening ratio adjusting step S14.

The controller 70 continuously performs the drying machine/washing machine simultaneous drying processes performing step S16 in the state in which the opening ratio of the flow path and the rotational speed of the drum are adjusted as described above, and the controller 70 performs a time elapse determining step 17 of determining whether a predetermined time elapses after the adjustment of the opening ratio of the flow path and the rotational speed of the drum is completed. The predetermined time can be set as 5 minutes to 10 minutes in consideration of the amount of laundry existing in the drying drum 22 and the washing drum 32 and the current remaining drying process time.

When the determination result indicates that the predetermined time has elapsed in the time elapse determining step 17, the controller 70 performs control to perform the humidity measuring step S12 again and end the drying process or perform the humidity difference value determining step S13, the flow path opening ratio adjusting step S14, the drum rotational speed adjusting step S15, and the drying machine/washing machine simultaneous drying processes performing step S16 again depending on the humidity measurement result.

In some examples, as illustrated in FIG. 9A and FIG. 9B, when the determination result indicates that the fourth process mode is selected in the process mode determining step S2, the remaining steps, except for the drying machine hot air flow path opening step S7, the drying machine drying/washing machine washing process performing step S8, the simultaneous drying processes entering determining step S9 performed in the third process mode, are performed. Therefore, the controller 70 performs control to immediately perform the drying machine/washing machine hot air flow path simultaneous opening step S10 simultaneously on the drying machine module 20 and the washing machine module 30 and then perform the above-mentioned subsequent steps.

It can be understood that the above-mentioned technical features of the present disclosure can be carried out in any other specific form by those skilled in the art without changing the technical spirit or the essential features of the present disclosure.

Accordingly, it should be understood that the aforementioned implementations are described for illustration in all aspects and are not limited, and the scope of the present disclosure shall be represented by the claims to be described below, and it should be construed that all of the changes or modified forms derived from the meaning and the scope of the claims, and an equivalent concept thereto are included in the scope of the present disclosure.

The invention claimed is:
1. A laundry treatment apparatus comprising:
a cabinet that defines an accommodation space therein;
a first laundry treatment module disposed in a first portion of the accommodation space;
a second laundry treatment module disposed in a second portion of the accommodation space;
a drying module configured to produce hot air, the drying module having:
a first outlet and a second outlet that are configured to supply the hot air to the first laundry treatment module and the second laundry treatment module, respectively, and
a first inlet and a second inlet that are configured to receive return air from the first laundry treatment module and the second laundry treatment module, respectively, the drying module being configured to absorb at least a part of moisture in the return air;

an outlet flow path switching valve configured to (i) selectively open one of the first outlet or the second outlet or (ii) simultaneously open both of the first outlet and the second outlet;

an inlet flow path switching valve configured to (i) selectively open one of the first inlet or the second inlet or (ii) simultaneously open both of the first inlet and the second inlet;

a first humidity sensor configured to measure a first humidity of the return air received through the first inlet;

a second humidity sensor configured to measure a second humidity of the return air received through the second inlet; and a controller electrically connected to the first humidity sensor and the second humidity sensor and configured to produce a control signal for operating at least one of the outlet flow path switching valve or the inlet flow path switching valve, wherein the controller is configured to:

receive a first sensor signal related to the first humidity and a second sensor signal related to the second humidity, the first humidity and the second humidity being measured while the hot air is supplied to the first laundry treatment module and the second laundry treatment module, determine a difference value between the first humidity and the second humidity based on receiving the first sensor signal and the second sensor signal, and based on the difference value exceeding a predetermined threshold value, operate the outlet flow path switching valve to change a first opening degree of the first outlet or a second opening degree of the second outlet, or both.

2. The laundry treatment apparatus of claim 1, further comprising:

a hot air supply duct comprising:
a first supply duct that connects the first outlet to the first laundry treatment module, and
a second supply duct that connects the second outlet to the second laundry treatment module; and a hot air recovery duct comprising:
a first recovery duct that connects the first inlet to the first laundry treatment module, and
a second recovery duct that connects the second inlet to the second laundry treatment module.

3. The laundry treatment apparatus of claim 2, wherein the first humidity sensor is disposed in the first recovery duct adjacent to the first inlet, and
wherein the second humidity sensor is disposed in the second recovery duct adjacent to the second inlet.

4. The laundry treatment apparatus of claim 1, wherein the drying module comprises:
a common duct that defines a hot air flow path having the first and second inlets and the first and second outlets;
a heater disposed in the common duct and configured to produce the hot air;
a blower fan disposed in the common duct and configured to blow the hot air toward the first outlet and the second outlet; and
a condenser configured to absorb at least a part of the moisture included in the return air received through the first inlet and the second inlet.

5. The laundry treatment apparatus of claim 1, wherein the controller is further configured to:

before determining the difference value between the first humidity and the second humidity, compare the first humidity and the second humidity to a predetermined target humidity; and based on both of the first humidity and the second humidity exceeding the predetermined target humidity, calculate the difference value between the first humidity and the second humidity.

6. The laundry treatment apparatus of claim 5, wherein the predetermined target humidity is a relative humidity of 60%.

7. The laundry treatment apparatus of claim 5, wherein the predetermined threshold value is a relative humidity of 10%.

8. The laundry treatment apparatus of claim 5, further comprising:

a first actuator electrically connected to the controller and configured to operate the outlet flow path switching valve based on the control signal of the controller; and a second actuator electrically connected to the controller and configured to operate the inlet flow path switching valve based on the control signal of the controller.

9. The laundry treatment apparatus of claim 8, wherein the controller is further configured to:

based on the first humidity being greater than the second humidity, produce a first control signal to increase the first opening degree of the first outlet and decrease the second opening degree of the second outlet according to a first predetermined ratio;

transmit the first control signal to the first actuator;

based on the second humidity being greater than the first humidity, produce a second control signal to increase the second opening degree of the second outlet and decrease the first opening degree of the first outlet according to a second predetermined ratio; and transmit the second control signal to the first actuator.

10. The laundry treatment apparatus of claim 9, wherein the controller is further configured to:

based on the first humidity being greater than the second humidity, produce a third control signal to increase a third opening degree of the first inlet and decrease a fourth opening degree of the second inlet according to a third predetermined ratio;

transmit the third control signal to the second actuator;

based on the second humidity being greater than the first humidity, produce a fourth control signal to increase the fourth opening degree of the second inlet and decrease the third opening degree of the first inlet according to a fourth predetermined ratio; and transmit the fourth control signal to the second actuator.

11. A method for controlling a laundry treatment apparatus, the laundry treatment apparatus including a cabinet that defines an accommodation space therein, a first laundry treatment module disposed in a first portion of the accommodation space, a second laundry treatment module disposed in a second portion of the accommodation space, and a drying module configured to produce hot air and to supply the hot air to the first laundry treatment module and the second laundry treatment module through a first outlet and a second outlet, respectively, the drying module being further configured to receive return air from the first laundry treatment module and the second laundry treatment module through a first inlet and a second inlet, respectively, and to absorb at least a part of moisture included in the return air, the method comprising:

supplying the hot air to the first and second laundry treatment modules through the first and second outlets, respectively;

absorbing at least a part of the moisture included in the return air received through the first and second inlets from the first and second laundry treatment modules;

measuring a first humidity of the return air received through the first inlet and a second humidity of the return air received through the second inlet;

determining a difference value between the first humidity and the second humidity;

determining whether the difference value exceeds a predetermined threshold value; and based on the difference value exceeding the predetermined threshold value, adjusting a ratio of amounts of the hot air to be supplied to the first laundry treatment module and the second laundry treatment module by changing a first opening degree of the first outlet or a second opening degree of the second outlet, or both.

12. The method of claim 11, wherein the first humidity is measured from the return air discharged from the first laundry treatment module by a first humidity sensor disposed adjacent to the first inlet; and wherein the second humidity is measured from the return air discharged from the second laundry treatment module by a second humidity sensor disposed adjacent to the second inlet.

13. The method of claim 12, further comprising:

comparing each of the first humidity and the second humidity to a predetermined target humidity; and determining whether each of the first humidity and the second humidity is less than or equal to the predetermined target humidity.

14. The method of claim 13, wherein the difference value is calculated based on both of the first humidity and the second humidity exceeding the predetermined target humidity.

15. The method of claim 13, wherein the predetermined target humidity is a relative humidity of 60%.

16. The method of claim 12, wherein the predetermined threshold value is a relative humidity of 10%.

17. The method of claim 13, wherein adjusting the ratio of the amounts of the hot air comprises:

based on the first humidity being greater than the second humidity, increasing the first opening degree of the first outlet and decreasing the second opening degree of the second outlet according to a first predetermined ratio; and based on the second humidity being greater than the first humidity, increasing the second opening degree of the second outlet and decreasing the first opening degree of the first outlet according to a second predetermined ratio.

18. The method of claim 17, wherein adjusting the ratio of the amounts of the hot air further comprises:

based on the first humidity being greater than the second humidity, increasing a third opening degree of the first inlet and decreasing a fourth opening degree of the second inlet according to a third predetermined ratio; and based on the second humidity being greater than the first humidity, increasing the fourth opening degree of the second inlet and decreasing the third opening degree of the first inlet according to a fourth predetermined ratio.

19. The method of claim 18, further comprising:

supplying the hot air through the first and second outlets and absorbing at least a part of the moisture in the return air received through the first and second inlets after adjusting the ratio of the amounts of the hot air by changing at least one of the first opening degree of the first outlet, the second opening degree of the second outlet, the third opening degree of the first inlet, or the fourth opening degree of the second outlet.

20. The method of claim 19, further comprising:

determining whether a predetermined time has elapsed since a start point of supplying the hot air through the first and second outlets after adjusting the ratio of the amounts of the hot air.

21. The method of claim 20, further comprising:

based on determining that the predetermined time has elapsed since the start point, repeating operations that comprise:

measuring the first humidity and the second humidity, comparing each of the first humidity and the second humidity to the predetermined target humidity, based on both of the first humidity and the second humidity exceeding the predetermined target humidity, calculating the difference value between the first humidity and the second humidity, and adjusting the ratio of the amounts of the hot air by changing at least one of the first opening degree of the first outlet, the second opening degree of the second outlet, the third opening degree of the first inlet, or the fourth opening degree of the second outlet.

* * * * *